United States Patent [19]

Takahashi et al.

[11] Patent Number: 5,406,349
[45] Date of Patent: Apr. 11, 1995

[54] INTERCHANGEABLE LENS AND INTERCHANGEABLE LENS SYSTEM

[75] Inventors: Koji Takahashi, Kanagawa; Susumu Kozuki, Tokyo; Hirokazu Mogi; Hideo Kawahara, both of Saitama; Hideyuki Arai, Kanagawa; Katsushi Suzuki, Tokyo; Toshiaki Mabuchi, Tokyo; Takashi Kobayashi, Tokyo, all of Japan

[73] Assignee: Canon Kabushiki Kaisha, Tokyo, Japan

[21] Appl. No.: 201,070

[22] Filed: Feb. 24, 1994

Related U.S. Application Data

[60] Continuation of Ser. No. 111,266, Aug. 24, 1993, abandoned, which is a continuation of Ser. No. 9,414, Jan. 27, 1993, abandoned, which is a continuation of Ser. No. 825,844, Jan. 24, 1992, abandoned, which is a continuation of Ser. No. 533,683, Jun. 5, 1990, abandoned, which is a division of Ser. No. 393,644, Aug. 14, 1989, Pat. No. 4,959,728.

[30] Foreign Application Priority Data

Aug. 31, 1988 [JP] Japan .................. 63-216919
Sep. 27, 1988 [JP] Japan .................. 63-243078
Nov. 30, 1988 [JP] Japan .................. 63-304856
Jan. 13, 1989 [JP] Japan .................. 1-006510

[51] Int. Cl.$^6$ .................. G03B 7/095; H04N 5/238
[52] U.S. Cl. .................. 354/455; 348/364
[58] Field of Search .................. 354/286, 410, 412, 446, 354/451, 452, 470, 271.1, 455; 348/363, 364, 365, 366

[56] References Cited

U.S. PATENT DOCUMENTS

| | | | |
|---|---|---|---|
| 4,437,752 | 3/1984 | Akashi et al. | 354/286 |
| 4,472,740 | 9/1984 | Doi | 358/225 X |
| 4,473,843 | 9/1984 | Bishop et al. | 358/228 X |
| 4,532,553 | 7/1985 | Brill | 358/228 |
| 4,638,366 | 1/1987 | Yoshimura et al. | 358/228 |
| 4,806,964 | 2/1989 | Tamada et al. | 358/228 X |
| 4,829,382 | 5/1989 | Hess et al. | 358/228 |
| 4,833,498 | 5/1989 | Kato et al. | 358/225 X |
| 4,963,986 | 10/1990 | Fukuyama et al. | 358/228 |
| 4,967,281 | 10/1990 | Takada | 358/225 X |

Primary Examiner—W. B. Perkey
Attorney, Agent, or Firm—Robin, Blecker, Daley & Driscoll

[57] ABSTRACT

Disclosed is an interchangeable lens system which comprises an interchangeable lens and a camera. the interchangeable lens includes a driving circuit controlled by data transmitted from the camera to the lens such that it displaces a controlled member of the lens, a detection circuit for detecting a displacement of the driving circuit, and a correction circuit for converting the output characteristics of the detection circuit into predetermined common characteristics. The camera includes a control circuit for driving the driving circuit in the interchangeable lens in response to the output of the detection circuit in the interchangeable lens.

26 Claims, 14 Drawing Sheets

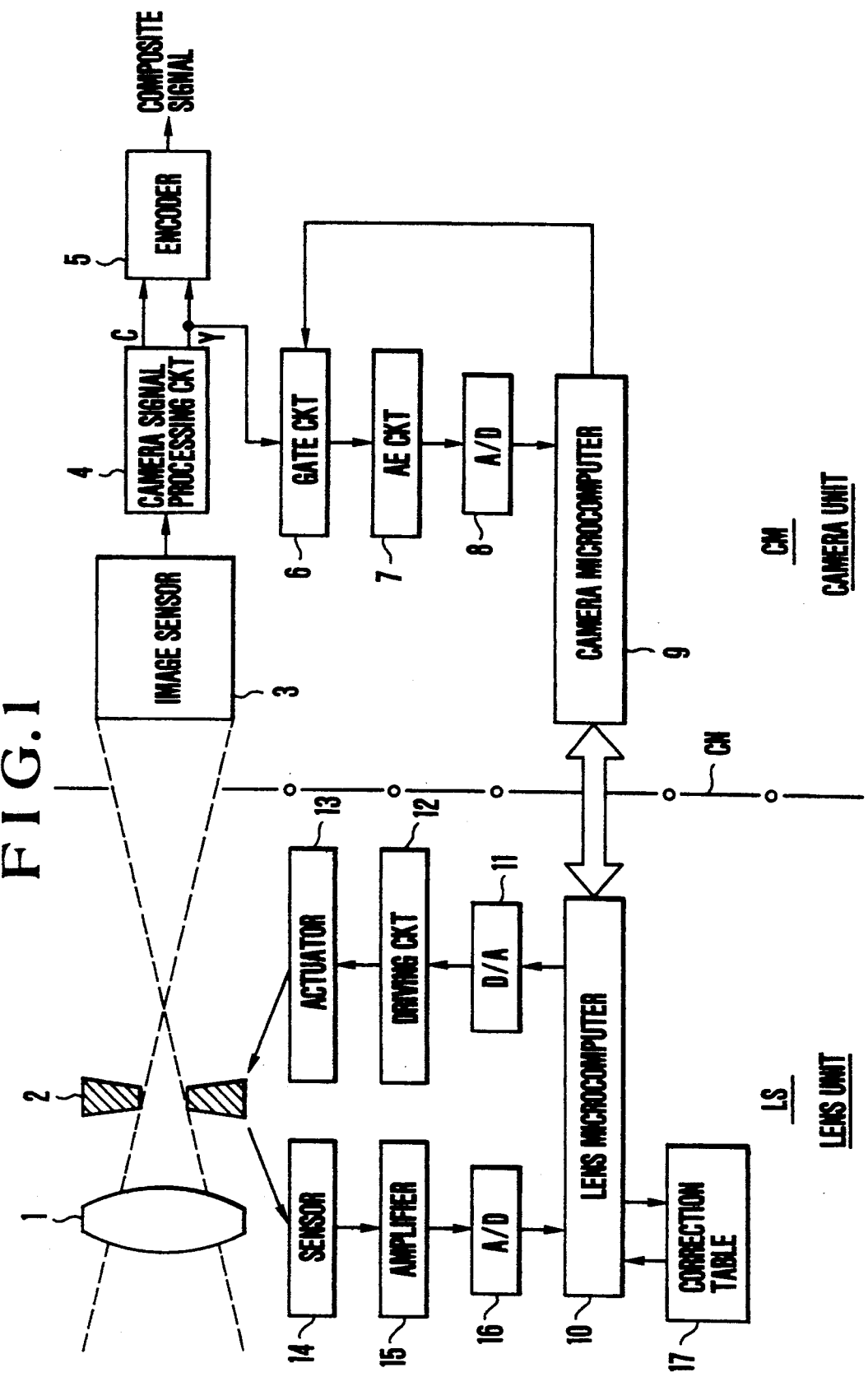

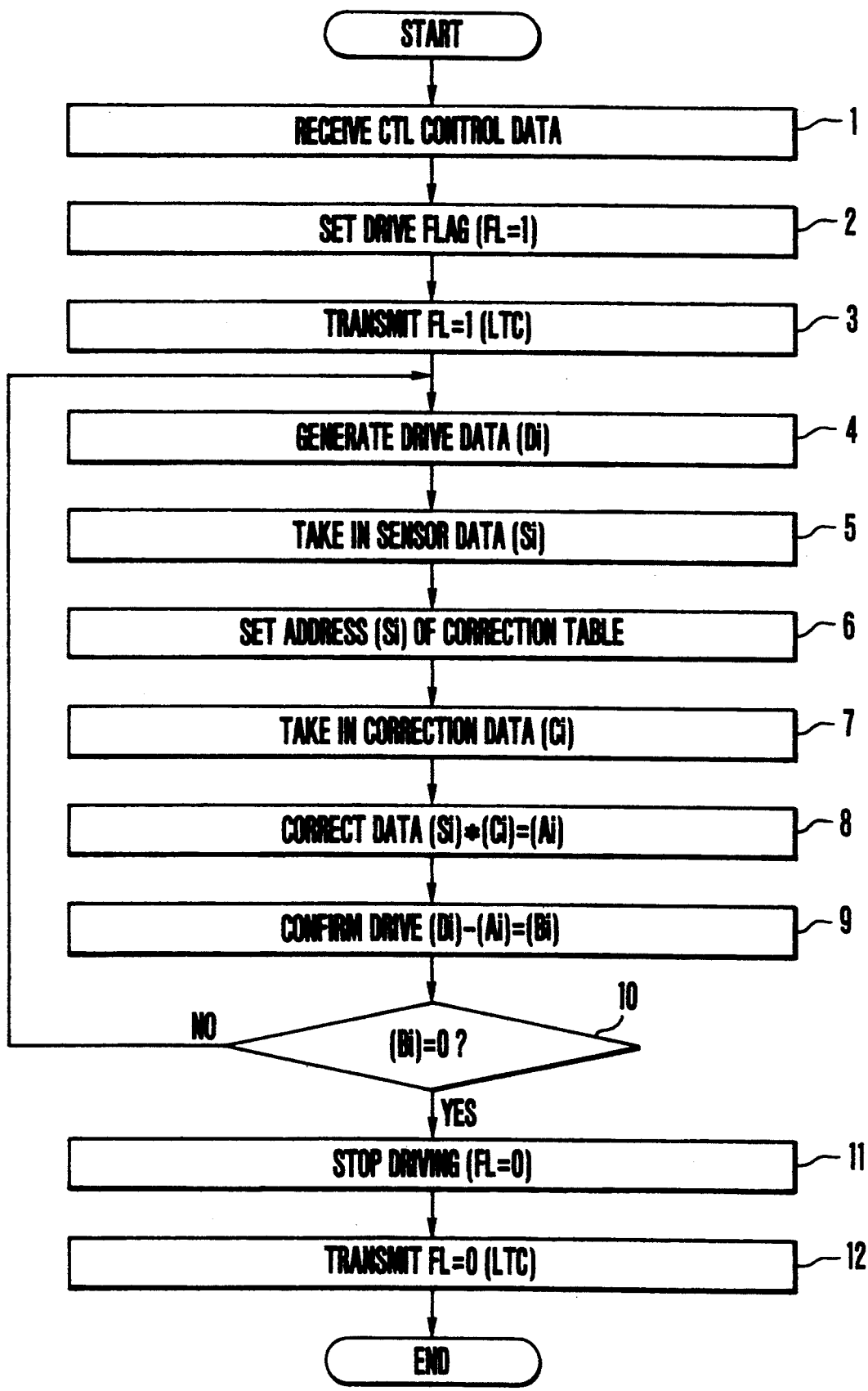

FIG.6

FROM GATE CKT 6 → [INTEGRATING CKT] 71 → [AMP] 72 → [DC LEVEL SHIFTING CKT] 73 → TO A/D CONVERTER 8

{ AE CKT 7 }

FIG.7

| DIFFERENCE IN LEVEL | +3EV OR ABOVE | +2EV | +1EV | STANDARD | -1EV | -2EV | -3EV | -4EV | -5EV | LESS THAN -5EV |
|---|---|---|---|---|---|---|---|---|---|---|
| COMMUNICATION DATA (DECIMAL) | 255 | 128 | 64 | 32 | 16 | 8 | 4 | 2 | 1 | 0 |
| COMMUNICATION DATA (HEXADECIMAL) | FFh | 80h | 40h | 20h | 10h | 8h | 4h | 2h | 1h | 0h |

CAMERA UNIT CM

CAMERA UNIT

LENS UNIT

INTERCHANGEABLE LENS AND INTERCHANGEABLE LENS SYSTEM

This is a continuation of prior application Ser. No. 08/111,266, filed Aug. 24, 1993, abandoned; which is a continuation of prior application Ser. No. 08/009,414, filed Jan. 27, 1993, abandoned; which is a continuation of prior application Ser. No. 07/825,844, filed Jan. 24, 1992, abandoned; which is a continuation of prior application Ser. No. 07/533,683, filed Jun. 5, 1990, abandoned; which is a division of prior application Ser. No. 07/393,644, filed Aug. 14, 1989, now U.S. Pat. No. 4,959,728.

BACKGROUND OF THE INVENTION

1. Field of the Invention

This invention relates to an interchangeable lens and an interchangeable lens system of the type in which information is exchanged between the lens and a camera.

2. Description of the Related Art

In a conventional interchangeable lens system, a controlled system of a lens unit is designed to have always the same configuration regardless of the types of lens employed. Furthermore, variations in the characteristics of the individual controlled systems which occur during the mass production are coped with by sorting parts having characteristics conforming to the standard.

However, the above-described conventional methods reduce mass production yield because of strict standards, thereby decreasing productivity. Further, technical restrictions created when an old type lens is designed are imposed on the design of a new type lens, preventing optimal design of the new type lens.

Further, in a conventional video camera, a diaphragm is controlled using an aperture value detected in an operated state of the camera by a sensor, such as a Hall element, provided at the diaphragm of the lens.

In the case of a video camera of the type in which a lens and a camera body are formed as one unit, an aperture value detection signal is transmitted from the lens to the camera body in the form of an analog signal.

In the case of a video camera of the type in which the lens can be detached from the camera body, a detection signal is converted into a digital signal by an A/D converter, and the digital signal is transferred to the camera body.

However, the quantization level at which the detection signal is converted into a digital signal may differ depending on the characteristics of the interchangeable lens employed, and this causes detrimental effects on the compatibility of the interchangeable lens system.

Furthermore, an interchangeable lens system which is adapted to a VTR or the like has its own exposure adjustment mechanism. This means that the exposure standard value of the lens, the dynamic range of an exposure signal or the like generated by a control circuit of the camera body vary in a wide range depending on the type of the lens employed. In consequence, sufficient compatibility of the lens control information cannot be ensured, this leading to the generation of automatic exposure adjustment errors.

In the control method in which digital communication is performed between a lens and a camera body, there is a possibility of delay in control or hunting.

SUMMARY OF THE INVENTION

An object of the present invention is to provide an interchangeable lens system which is intended to eliminate the aforementioned problems of the prior art, which enables malfunctions of an interchangeable lens to be eliminated, and which ensures a high system extensibility.

In order to achieve the aforementioned object, the present invention provides in one form an interchangeable lens and an interchangeable lens system which includes correction means for correcting the output of detection means of a controlled system such that the virtual response characteristic of the controlled system to a camera unit becomes a predetermined common function (e.g., linear).

In this way, a highly compatible interchangeable lens system, in which common control can be performed regardless of the characteristics of the controlled system, can be provided.

In order to achieve the aforementioned object, the present invention provides in another form an interchangeable lens which comprises driving means controlled by data transmitted from a camera body to the lens for operating a controlled member of the lens, detection means for detecting a state of the driving means, and correction means for converting an output of the detection means into a signal representing either of a plurality of absolute, common regions.

The present invention provides in another form an interchangeable lens system which comprises: an interchangeable lens including detection means for detecting a state of a controlled member of the lens and correction means for converting an output of the detection means into a signal representing either of a plurality of absolute, common regions; and a camera on which the interchangeable lens can be detachably mounted, the camera including control means for forming a control signal which controls the controlled member by photoelectrically converting an image received through the lens.

In this present invention, the output of the aperture value detection sensor is corrected such that the virtual response characteristic of the aperture value detection sensor to the camera body becomes linear, and this linear region is divided into fixed regions. In consequence, highly compatible interchangeable lens and the interchangeable lens system, in which common control can be performed regardless of the characteristics of the aperture value detection sensor, can be provided.

The present invention provides in another form an interchangeable lens system which comprises a camera unit and a lens unit that can be detachably mounted on the camera unit. The camera unit includes exposure control signal forming means for forming an exposed state control signal for controlling an exposed state and a control reference value of the exposed state control signal, an encoder for converting the exposed state control signal into coded data, and transmission means for transmitting the coded data to the lens unit. The lens unit includes control means for controlling the exposed state on the basis of the coded data received.

In this way, an optimal exposure adjustment operation is enabled regardless of the type of lens combined with the camera unit.

The present invention provides in another form an image sensing apparatus of the type in which an exposed state is feedback controlled on the basis of the output of image sensing means. The image sensing apparatus includes control means for varying the amount of feedback according to a frequency of the changes in the output.

The present invention provides in another form an interchangeable lens system which comprises a camera unit and a lens unit that can be detachably mounted on the camera unit. The camera unit includes exposure control signal forming means for forming an exposed state control signal for controlling an exposed state and a control reference value of the exposed state control signal, an encoder for converting the exposed state control signal into coded data, and transmission means for transmitting the coded data to the lens unit. The lens unit includes control means for controlling a transition process of the exposed state on the basis of the coded data received.

In this way, hunting in the exposure control can be prevented. Further, an optimal exposure adjustment operation is enabled regardless of the type of lens combined with the camera unit.

Other objects and features of the present invention will become more apparent from the following description of the preferred embodiments thereof, taken in conjunction with the accompanying drawings.

BRIEF DESCRIPTION OF THE DRAWINGS

FIG. 1 is a schematic view of a first embodiment of the present invention;

FIG. 3 is a flowchart of the operation of a lens microcomputer;

FIG. 6 is a block diagram of part of a third embodiment of the present invention;

FIG. 7 shows an example of exposure control data employed in third and fourth embodiments of the present invention;

DETAILED DESCRIPTION OF THE PREFERRED EMBODIMENTS

Figure 2A:
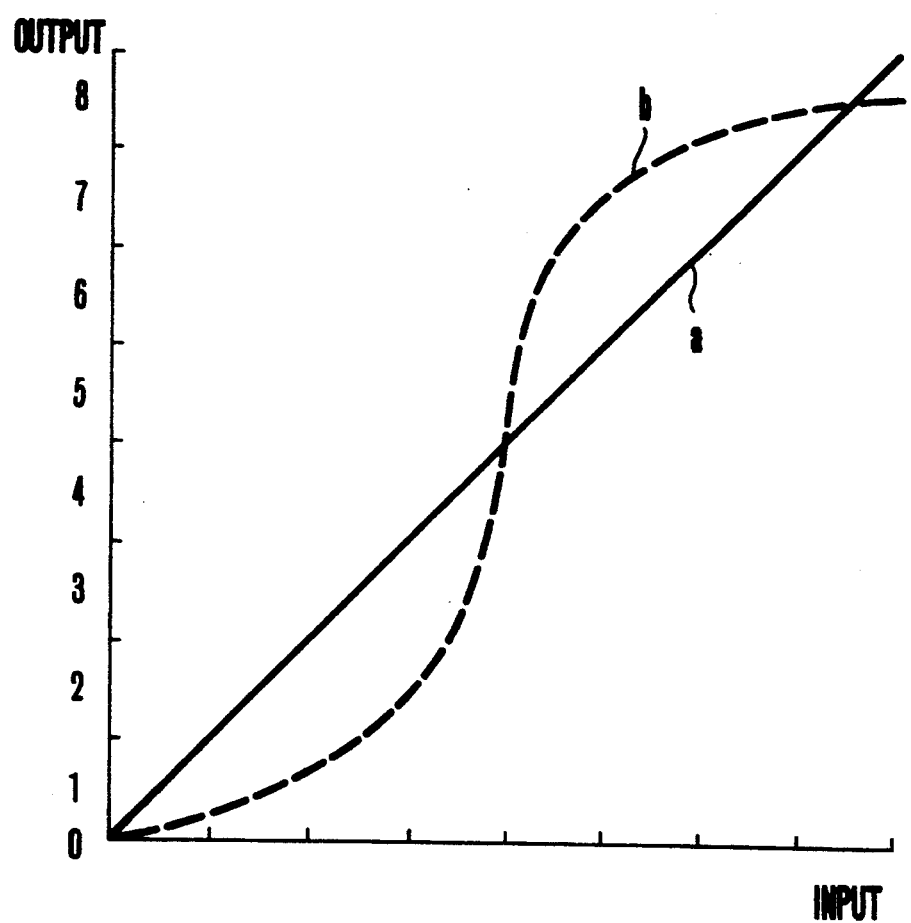
FIG. 2(A) shows an example of sensor input/output characteristics of the present invention.

FIG. 1 shows a first embodiment of the present invention.

Diaphragm control in a video camera of the type in which a lens LS and a camera body CM can be separated from each other will be described below.

As image of an object (not shown) is formed on an image sensor 3 of the camera body by an optical system 1 and an iris 2 of the lens.

An image signal representing the image formed on the image sensor 3 is supplied to a camera signal processing circuit 4. The camera signal processing circuit 4 produces a color signal C and a luminance signal Y as a video signal. The video signal passes through an encoder 5 that employs an NTSC method or the like, and is output from the camera body in the form of a composite video signal or the like.

Also, the luminance signal Y is supplied to an automatic exposure (AE) circuit 7 for generating an iris control signal in order to control the iris 2 according to the luminance of the picture such that correct exposure can be obtained.

More specifically, a portion of the luminance signal which represents a predetermined portion of the picture is extracted by a signal gate circuit 6 which is controlled by a camera microcomputer 9, and the extracted portion of the luminance signal is supplied to the AE circuit 7. The AE circuit 7 generates a control signal in order to control the iris 2 of the lens and thereby maintain the picture in a correctly exposed state. The control signal generated by the AE circuit 7 is converted into a digital signal by an A/D converter 8, and the resultant digital signal is input to the camera microcomputer 9.

The camera microcomputer 9 transmits the digital control data to a lens microcomputer 10 through a connector CN that directly connects the camera microcomputer 9 and the lens microcomputer 10. The control data transmitted from the camera unit is converted into an analog signal by a D/A converter 11. The analog signal passes through a driving circuit 12 and is then supplied to an actuator 13, which drives the iris 2.

The results of the driving is detected by an iris sensor 14. The detection signal of the iris sensor 14 passes through a sensor amplifier 15, and the resultant signal is converted into a digital signal by an A/D converter 16. The digital signal is then input to the lens-microcomputer 10. The lens microcomputer 10 compares the digital signal and the control signal which is output to the D/A converter 11. The microcomputer 10 continues to drive the actuator 13 until the desired results can be obtained.

In this way, a servo loop within the lens is formed, which monitors whether the iris 2 is driven as is instructed by the control data transmitted from the camera microcomputer 9.

Following has to be taken into consideration when this servo loop is to be formed:

(1) variations in the characteristics of the individual sensors 14;

(2) differences in the characteristics which are determined by the type of the sensor 14 or the detection method employed by the sensor 14;

(3) differences in the characteristics which are determined by the shape or the structure of the iris 2, or the number of blades.

In order to achieve a sensor system which is capable of absorbing the differences in these characteristics and which has a virtually linear input/output characteristic, a correction table 17 is employed in this embodiment.

The correction table 17 is created as follows: First, the standard characteristics (such as those shown by "a" in FIG. 2(A)) are set, and the difference between these standard characteristics and the data detected by the sensor 14 (such as that shown by "b" in FIG. 2(A)) is then obtained. This difference is written in the correction table 17 as correction data. The correction table 17 may be a memory such as EEPROM.

During the driving of the iris 2, the ROM table of the correction table 17 is accessed by using the output of the A/D converter 16, which is the data detected by the sensor 14, as an address to read out the correction value stared beforehand, the correction value being then converted into the standard characteristics.

The axis of ordinate in the characteristics conversion table shown in FIG. 2(A) represents the final output of the iris sensor system.

Furthermore, in this embodiment, the axis of ordinate is divided into absolute, common eight regions, which correspond to the individual aperture values.

Figure 2B:
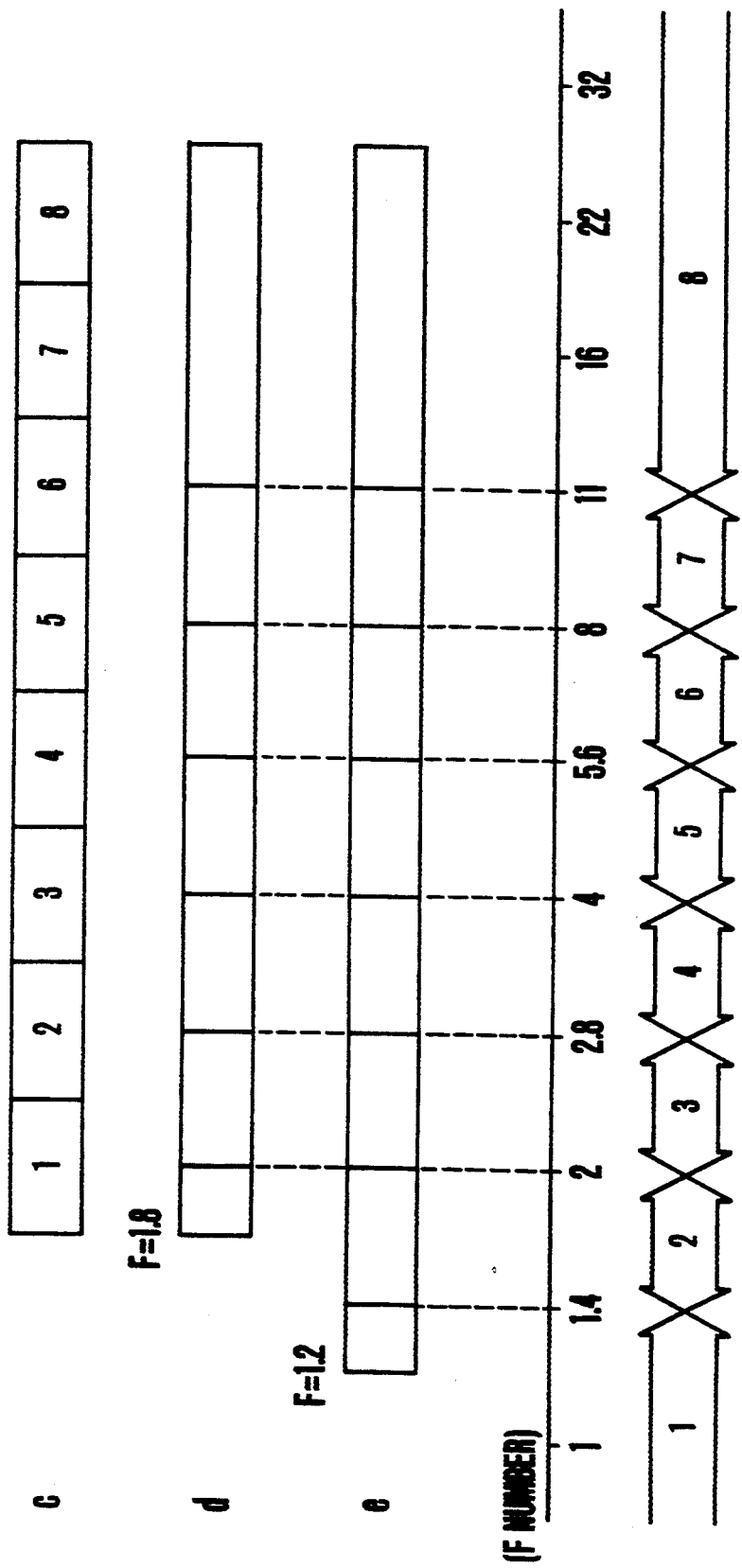
FIG. 2(B) shows an example of division of a region.

FIG. 2(B) shows a concrete example of the eight-region division.

The axis of abscissa represents the F-number indicating the state of the iris.

For example, the output of the iris sensor may be divided into fixed regions in the manner described below.

1: F=1.4 or less
2: F=1.4 to 2.0
3: F=2.0 to 2.8
4. F=2.8 to 4.0
5: F=4.0 to 5.6
6. F=5.6 to 8.0
7: F=8.0 to 11.0
8: F=11.0 or above Region division method of the present invention will be described in detail below using three lenses c, d, and e.

Both of the lenses c and d have a full-aperture F number of 1.8. In the case of the lens c, the output of the iris sensor is divided into eight regions with the full-aperture F number being as the standard. In the case of the lens d, the output of the iris sensor is divided into the eight fixed regions which are described above. The lens e has a full-aperture F number of 1.2, and it also employs the above-described eight fixed region division.

As can be seen from the above description, the same region can be used to denote the same states of the irises of the lenses having different full-aperture F numbers. This allows the camera unit to readily cope with different types of lenses.

The thus-obtained aperture information is employed in the above-described servo loop. Alternatively, it may be transmitted to the camera microcomputer 9 through the lens microcomputer 10, by means of which a servo loop is formed for exposure control by the iris 2, the image sensor 3, the camera signal processing circuit 4, the gate circuit 6, the AE circuit 7, the A/D converter 8, the camera microcomputer 9, the lens microcomputer 10, the D/A converter 11, the driving circuit 12, and the actuator 13.

The control data transmitted from the camera microcomputer 9 may be data representing the direction of drive of the aperture blades and data representing the amount of drive thereof.

FIG. 3 is a flowchart of the operation of the microcomputer 10 incorporated in the lens LS which is performed to form the former servo loop. First, in step #1, the microcomputer 10 receives the control data which is transmitted from the camera, and then sets "1" in the drive flag FL in step #2. Thereafter, in step #3, the microcomputer 9 transmits the flag FL to the camera microcomputer 9, and then generates in step #4 drive data $D_i$ on the basis of the data which has been received from the camera in step #1. Next, in step #5, the microcomputer 9 receives the data $S_i$ from the sensor 14, and then sets the address of the correction table 17 in step #6. Subsequently, in step #7, the microcomputer 9 receives correction data $C_i$, operates $S_i * C_i = A_i$ to obtain data $A_i$ used for data correction in step #8, then obtains the difference $B_i$ between data $A_i$ and data $D_i$ in step #9. Execution of the processings from steps #4 to #9 is repeated until it is determined in step #10 that the difference $B_i$ is 0. Once $B_i$ has been 0, the microcomputer 9 stops the drive in step #11, and then transmits flag FL "0" to the camera in step #12.

Next, a second embodiment of the present invention will be described below with reference to FIGS. 4 and 5.

In this embodiment, the correction table contains two types of data, the one (i) representing variations in the characteristics determined by the type of the lens, and the other (ii) representing variations in the characteristics of the individual products which occur during the mass production.

Data (i) is stored in a correction table 18, and data (ii) is stored in a correction table 19.

Unlike the first embodiment in which the correction table stores data on the basis of which correction is made, corrected data is stored in each of the correction tables in the second embodiment. This simplifies the data processing executed after the read-out of the ROM tables.

The two ROM tables are dependently connected with each other. So, read-out of the tables is performed as follows: As shown in the flowchart in FIG. 5, the correction table 18 is accessed using the output $S_i$ of the A/D converter 16 as an address in step #6-1, and the corrected data $X_i$ is then read out in step #7-1. Thereafter, the correction table 19 is accessed using the data $X_i$ as an address in step #6-2, and the corrected data $Y_i$ is read out from the correction table 19 in step #7-2. Next, in step #9', the difference $Z_i$ between the data $Y_i$ and the driving data $D_i$ is obtained, and then execution of the processings from steps #4 to #9' is repeated until it is determined in step #10' that the difference $Z_i$ is 0. In this way, lens designing can be performed independently of the adjustment operations performed during the mass production. It is also possible to prepare a common ROM which can be used in various applications.

As will be understood from the foregoing description, it is possible to absorb the variations in the characteristics of the individual lenses which occur during the mass production and changes in the characteristics which are determined by the types of the sensor or the optical control mechanism which are employed in the lens unit. In consequence, predetermined procedures can be used by the camera unit to control the lens unit even when different types of lenses are employed. This provides for an interchangeable lens system which can be handled by a simple operation. In the above-described embodiments, aperture control has been described. However, an auto focusing member, a zoom lens or a shutter may also be controlled in the same manner as that described above.

Furthermore, in the above-described embodiments, the output of the aperture value detection sensor is corrected such that the virtual response characteristics thereof become linear, and this linear output region is divided into a plurality of absolute, fixed regions. In consequence, it is possible to achieve a highly compatible interchangeable lens or interchangeable lens system in which a common control can be performed regardless of the characteristics of the aperture value detection sensor.

Next, a third embodiment of the present invention will be described below with reference to FIGS. 6 to 8.

Figure 4:
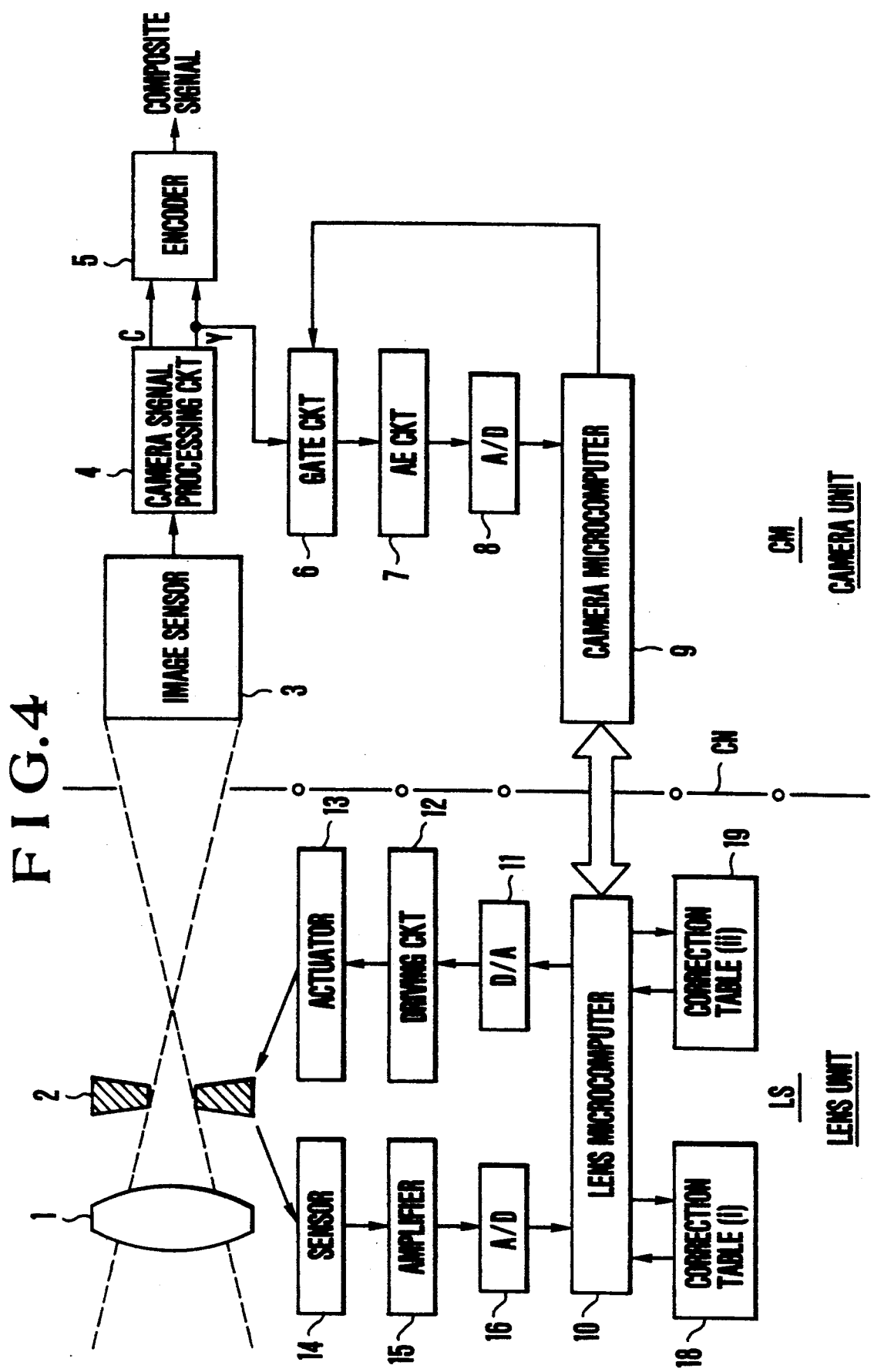
FIG. 4 is a schematic view of a second embodiment of the present invention.
Figure 5:
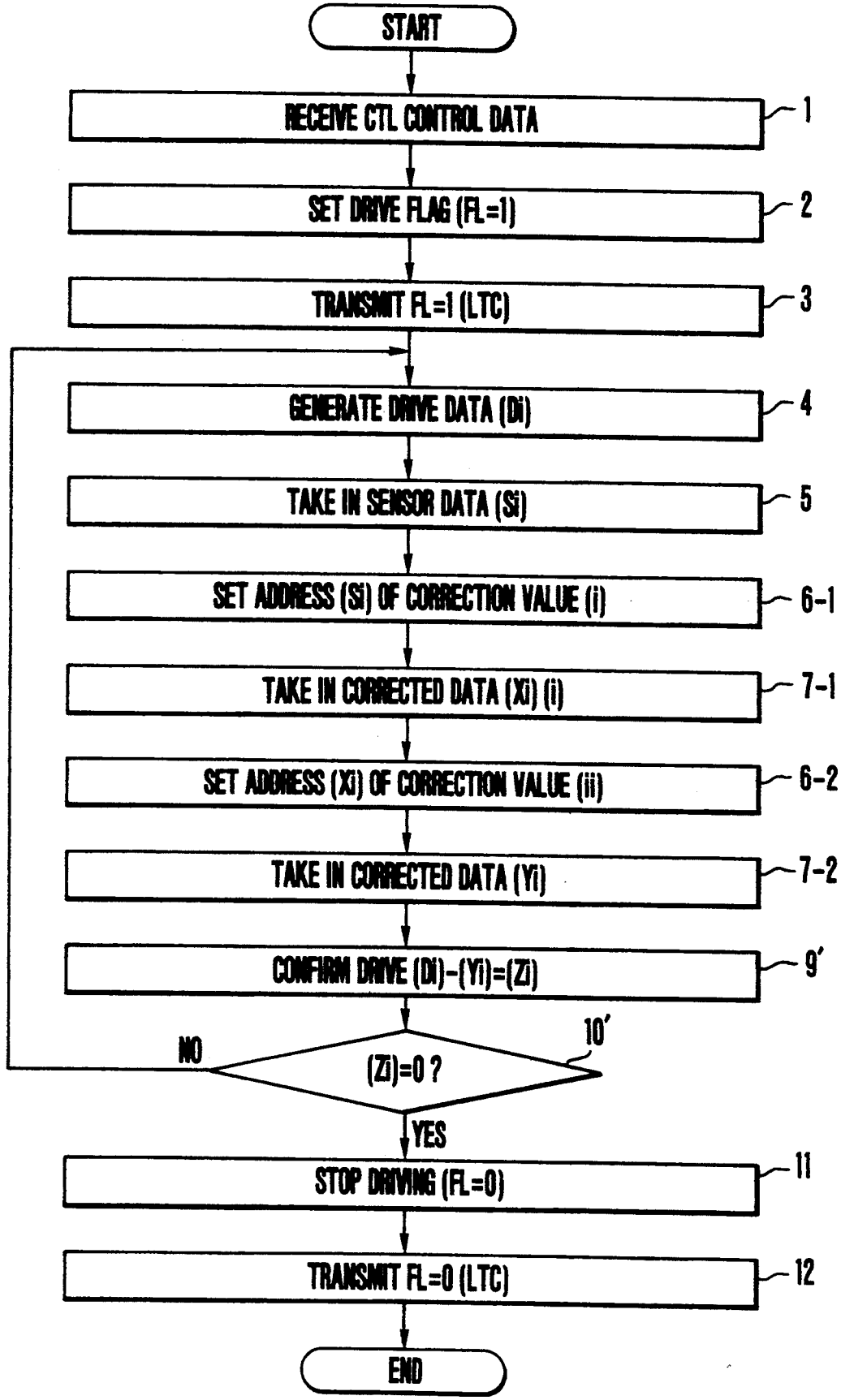
FIG. 5 is a flowchart of the operation executed in the second embodiment of the present invention.

In this embodiment, the AE circuit 7 shown in FIGS. 1 and 4 has the configuration shown in FIG. 6.

In the AE circuit 7, the luminance signal Y is integrated by an integrating circuit 71, and the resultant signal is amplified to a predetermined level by an amplifier 72. Thereafter, the output of the amplifier 72 is adjusted by a DC level shifting circuit 73 such that a reference level represents the same voltage in the different types of cameras.

FIG. 7 shows an example of the communication data which is set by adjusting the amplifier 72 and the DC level shifting circuit 73 according to the luminance of the signal input to the AE circuit 7.

The control data shown in FIG. 7 is representative values of the control data which are expressed in 8 bits (256 stages).

As shown in FIG. 7, the differences in level are expressed by exposure values (EV). For example, +1 EV means 1 EV (one aperture value) overexposure relative to the correct exposure, and that the iris in the lens unit should be closed by 1 EV.

Further, in this embodiment, a reference value for the exposure control is set to "32". When this data is transmitted, driving of the iris 2 is not performed.

The control data transmitted from the camera unit to the lens unit is converted into an analog signal by the D/A converter 11, and the analog signal is supplied to the actuator 13 through the driving circuit 12 to drive the actuator 13 and hence the iris 2.

Thus, in this embodiment, the exposure control signal including the stoppage of iris drive which is generated on the basis of the video signal level as iris control information is converted into a digital signal, and the digital signal is transmitted to the lens unit. In this way, the virtual difference in the gains within a camera can be neglected, and the difference in the dynamic ranges of cameras can also be neglected.

Furthermore, the reference value is expressed by a predetermined code, and this improves compatibility of the system.

In this embodiment, communication data is an 8-bit data. However, it may also be expressed by data having any number of bits. Further, the reference value may be any value other than 32.

Next, another example of the control operation in the interchangeable lens system shown in FIG. 1 will be described below with reference to FIG. 8.

First, the processing executed by the camera unit will be described.

Step #13: The output of the AE circuit 7 is received from the A/D converter 8

Step #14: Input of a video vertical synchronizing signal (Vsync) is awaited for a certain number of fields.

Step #15: A chip-select signal is set.

Step #16: Parallel iris data is converted into serial sequential iris data, and the converted data is transmitted from the camera unit to the lens unit.

Step #17: The chip-select signal is reset. Next, the processing executed by the lens unit will be described.

Step #18: Input of the chip-select signal is confirmed.

Step #19: Serial sequential iris data is received as parallel data.

Step #20: The iris data received is sent to the D/A converter 11.

Thus, communication of the control data is performed between the camera unit and the lens unit, whereby control is executed.

As will be clear from the foregoing description, even if any type of interchangeable lens is combined with the camera unit, the difference in the characteristics of the exposure adjustment mechanisms can be compensated for without modifying the camera unit, enabling provision of a highly reliable interchangeable lens system which ensures that the performance of the exposure adjustment mechanisms which may differ according to the types of lens employed is the same.

Figure 9:
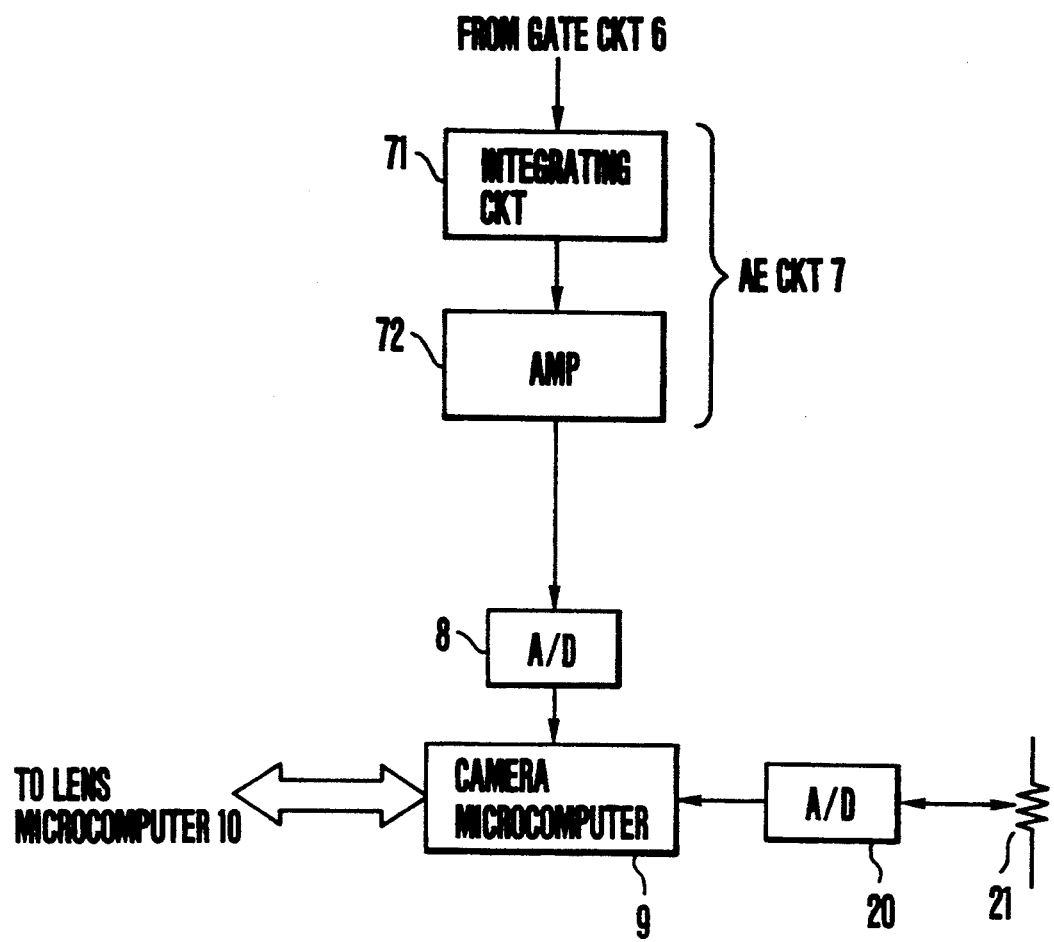
FIG. 9 illustrates a fourth embodiment of the present invention.

Next, a fourth embodiment of the present invention will be described below with reference to FIGS. 9 and 10.

In the fourth embodiment, part of the AE circuit (71, 72 and 73) included in the third embodiment is incorporated in the camera microcomputer 9.

Whereas predetermined codes representing the iris control information are generated by adjusting the bias and the amplification factor in the third embodiment, a reference value is generated by a reference voltage generator 21 in the fourth embodiment, the generated reference value being sent to the camera microcomputer 9 through an A/D converter 20.

The processing executed in the camera microcomputer 9 will be expressed as follows:

$$Di=(Yc-Yb)/(Yr-Yb)\times 32 \qquad (1)$$

where Di is iris data, Yc is the AE control signal input to the camera microcomputer 9, Yr is the Yc level at the reference level, and Yb is the Yc level when no light falls on the imaging sensor. Yr level is set by the reference voltage generator 21, and the generated Yr level is sent to the camera microcomputer 9 through the A/D converter 20.

Other processing is the same as that executed in the third embodiment. FIG. 10 is a flowchart of the operation executed in the fourth embodiment.

The processing executed in the camera unit will be described first.

Step #13: The output of the AE circuit 7 is received from the A/D converter 8.

Step #21: The reference level is received from the A/D converter 20.

Step #22: Iris data Di is operated.

Step #14: Input of a video vertical synchronizing signal (Vsync) is awaited for a certain number of fields.

Step #15: A chip-select signal is set.

Step #16: Parallel iris data is converted into serial sequential iris data, and the converted data is transmitted from the camera unit to the lens unit.

Step #17: The chip-select signal is reset.

Figure 8:
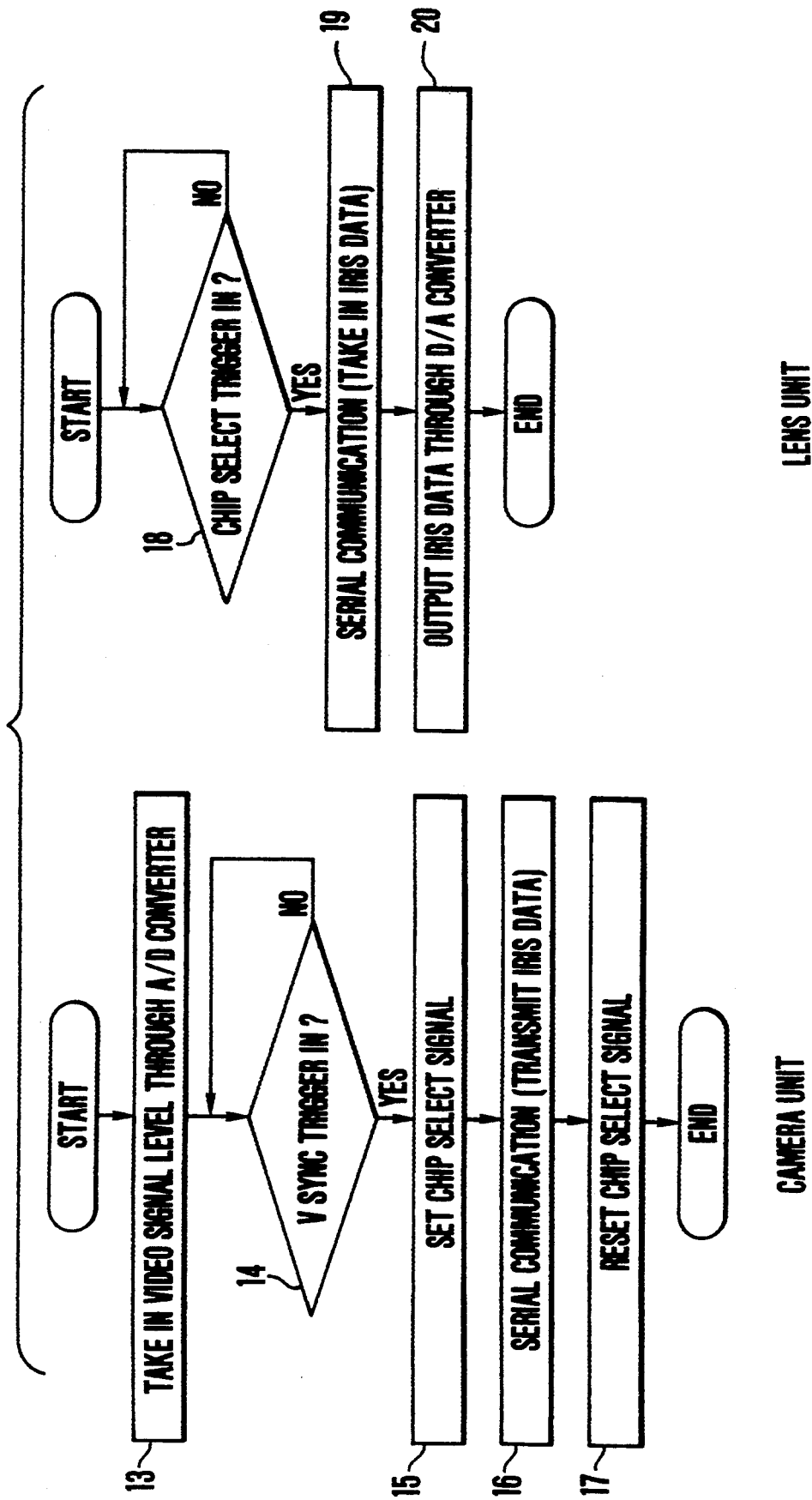
FIG. 8 is a flowchart of the operation executed in the embodiment shown in FIG. 6.

The lens microcomputer 10 executes the same processing as that shown in FIG. 8.

Thus, communication of the control information is performed between the camera unit and the lens unit, whereby control is executed.

In the third and fourth embodiments of the present invention, the codes representing the reference value and the exposure values which express the differences from this reference value are set beforehand, as shown in FIG. 7, and exposure control is performed by transmitting either of these codes. In this way, any type of interchangeable lens can be coped with without modifying the structure of the camera unit.

In other words, it is possible to provide an extendable system which is capable of coping with newly designed lenses without any problem, i.e., it is possible to greatly increase the possibility of the system expansion.

Furthermore, since the processing of the reference value is performed by the camera microcomputer, the initially adjusted values can be deleted and the possibility of the age deterioration can be decreased.

Next, a fifth embodiment of the present invention will be described below.

Figure 11:
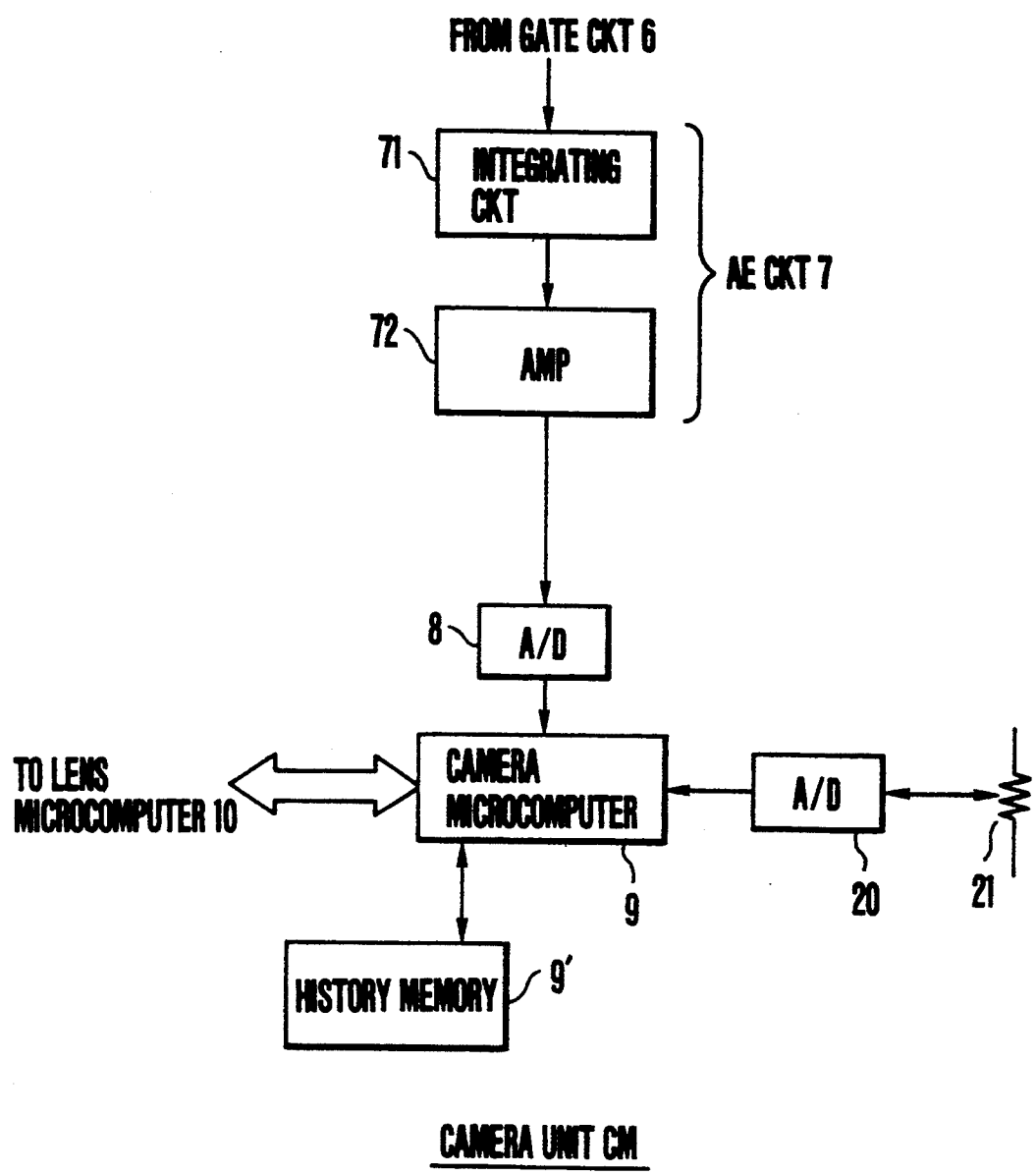
FIG. 11 is a block diagram of the essential parts of an image sensing apparatus and an interchangeable lens system, showing a fifth embodiment of the present invention.

In this embodiment, a history memory 9' which is accessed by the camera microcomputer 9 is incorporated in the fourth embodiment, as shown in FIG. 11. This memory stores the average value of the iris data over a certain period of time or a number of times inversion took place in the iris data over a certain period of time.

Figure 10:
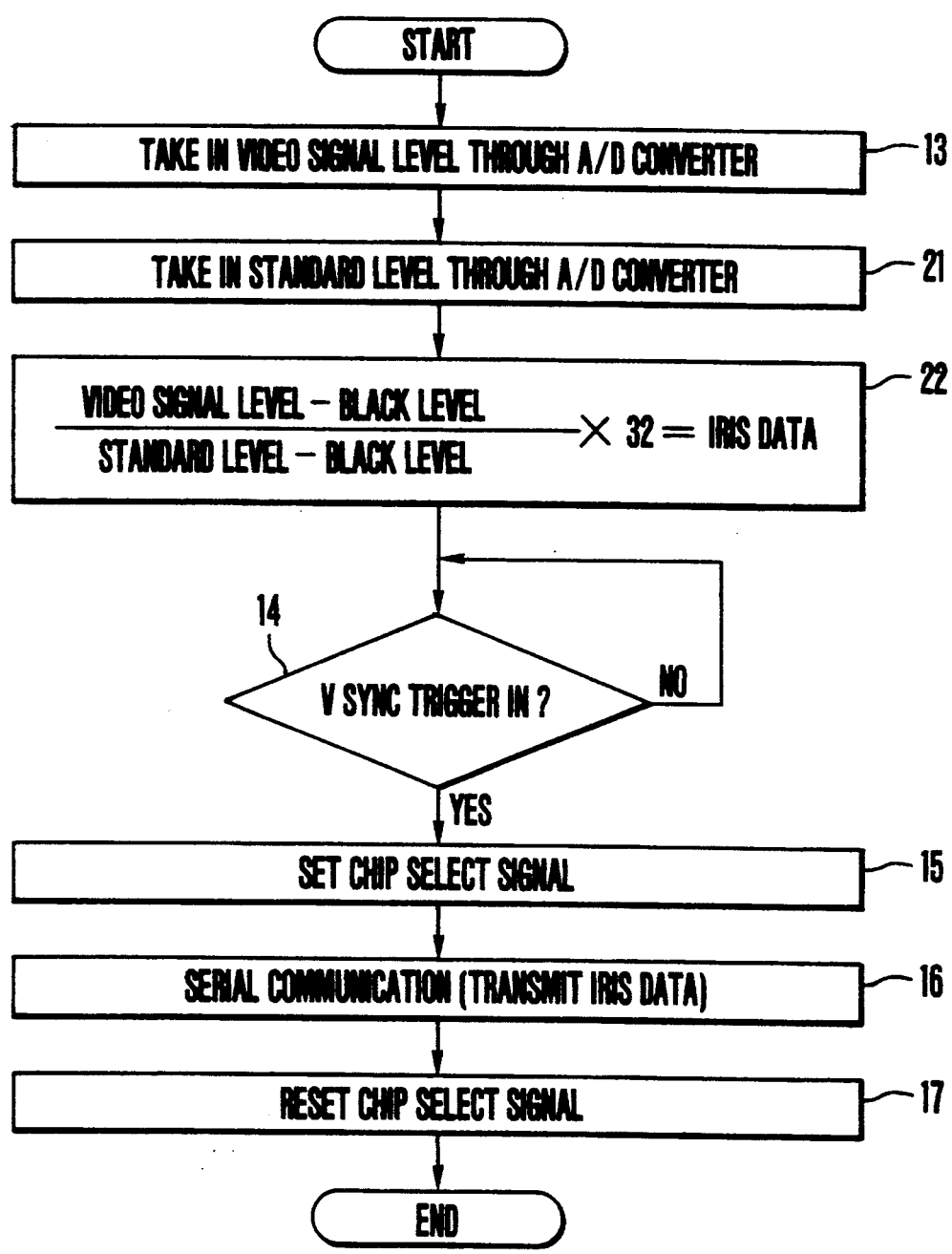
FIG. 10 is a flowchart of the operation executed in the fourth embodiment of the present invention.
Figure 12:
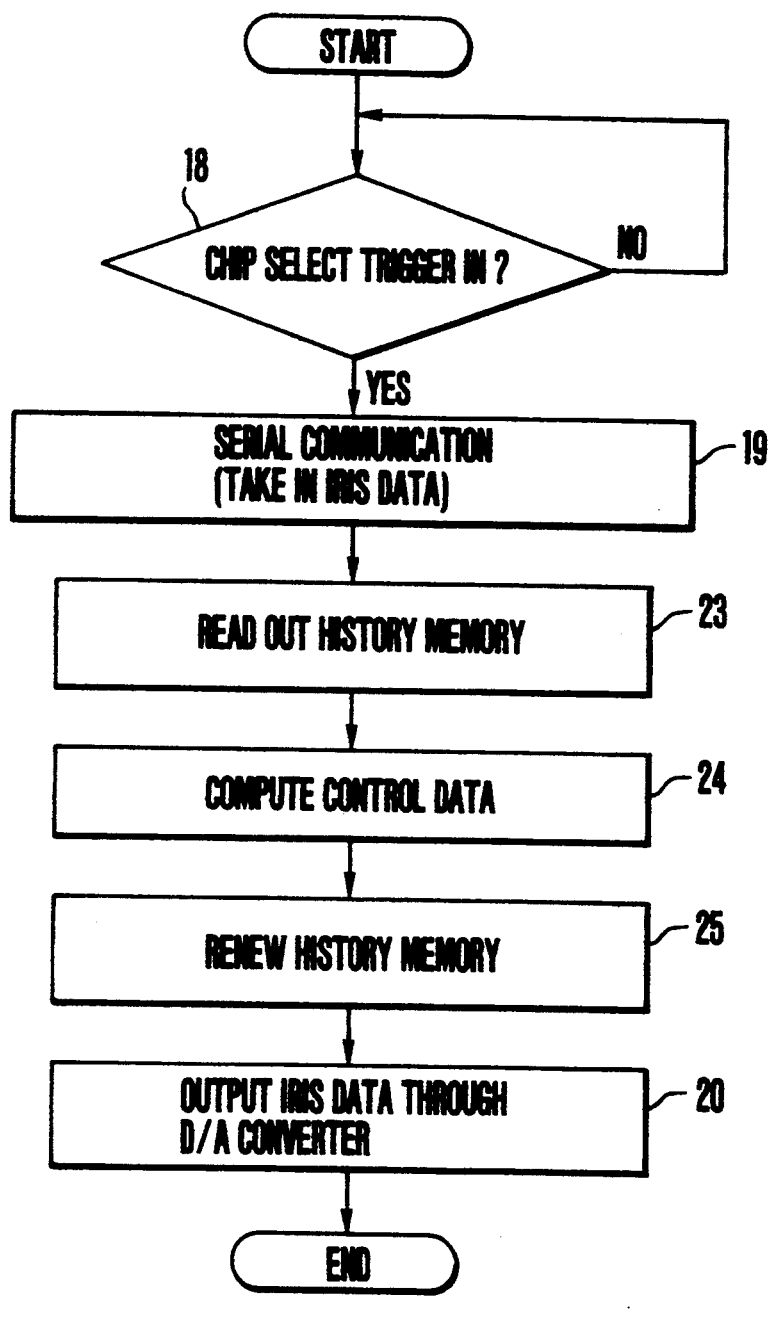
FIG. 12 is a flowchart of the operation executed by the system shown in FIG. 11.

The camera microcomputer 9 performs the same processing as that shown in FIG. 10, and the lens microcomputer 10 executes the processing shown in FIG. 12, which includes:

Step #18: It is determined whether or not the chip-select signal is input.

Step #19: Serial iris data is received as parallel data.

Step #23: The control value Di for a preceding few fields is read out from the history memory 9'.

Figure 13A:
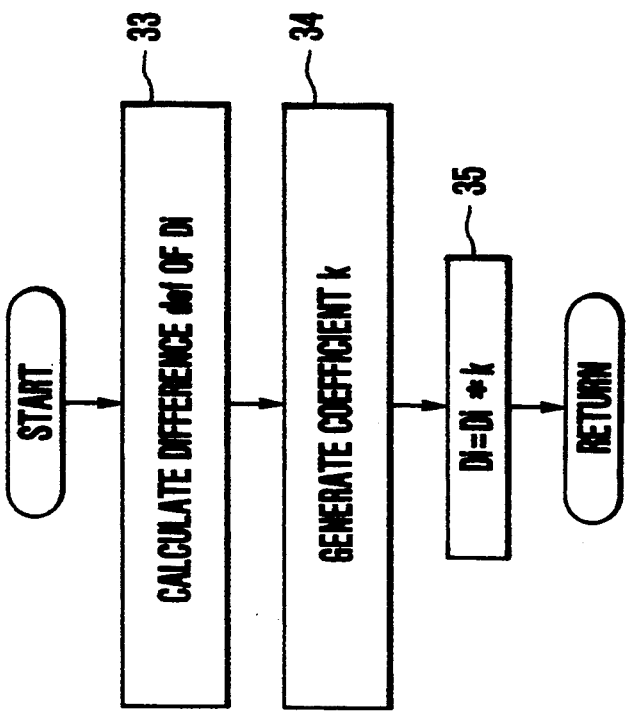
FIGS. 13(A) and 13(B) are flowcharts of subroutines executed in the embodiment shown in FIG. 12.

Step #24: The subroutine shown in FIG. 13(A) is executed to calculate the control data, that is, Step #30: The number of times N that the sign of the control signal inverted in the predetermined number of preceding fields is counted.

Step #31: The feedback coefficient k is set according to N. In a case where the feedback coefficient k is large, it is set at a lower value so that the response of the iris can be slowed down, so as to prevent hunting.

Step #32: Operation of Di=Di k is executed to obtain iris control data. Thereafter, the processing returns to the main routine.

Step #25: The contents of the history memory 9' are renewed by the value calculated in step #24.

Step #20: The iris data is output through the D/A converter 11.

Thus, communication of control information is performed between the camera unit and the lens unit, whereby iris control is performed.

Next, a sixth embodiment of the present invention will be described below.

In this embodiment, operation of the control data (Di) which employs the history memory 9' is executed in the camera unit. This operation will be described later with reference to the subroutine shown in FIG. 13(B).

The hardware structure and other processings are the same as those of the fifth embodiment.

Figure 14:
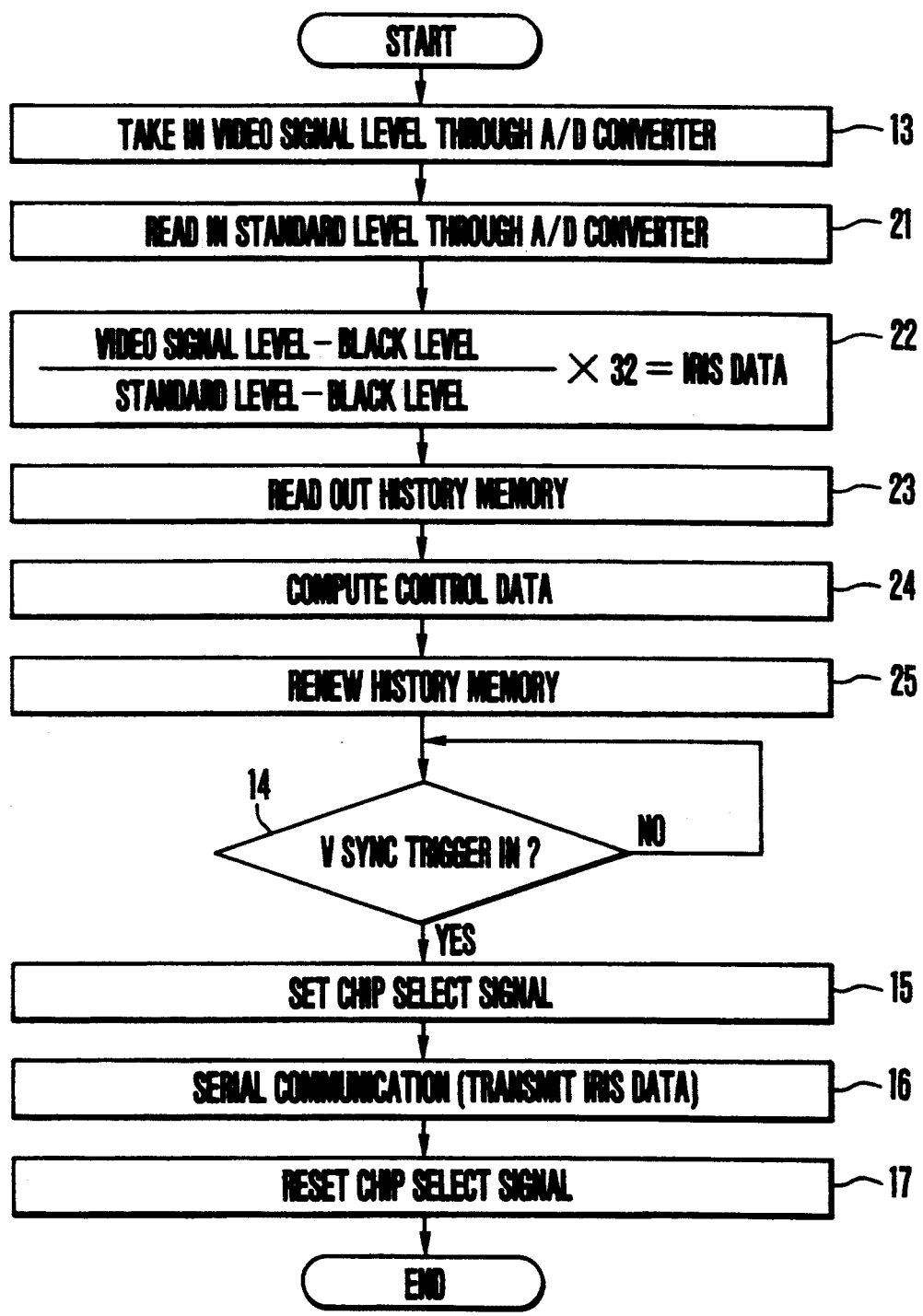
FIG. 14 is a flowchart of the operation executed by a camera unit, showing a sixth embodiment of the present invention.

In other words, the microcomputer 10 uses the same algorithm as that shown in FIG. 8, and the microcomputer 9 employs the algorithm shown in FIG. 14.

First, the processing executed by the camera microcomputer will be described.

Step #13: The output of the A/E circuit 7 is received through the A/D converter 8.

Step #21: The reference level is received through the A/D converter 20.

Step #22: The operation expressed by Equation (1) is executed to form the iris data Di.

Step #23: The control data Di for a preceding few fields is read out from the history memory 9'.

Figure 13B:
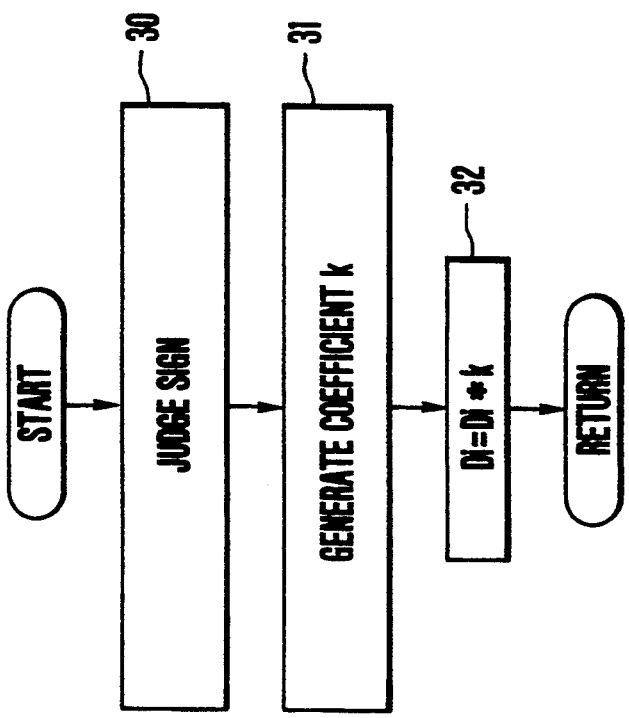

Step #24: The subroutine shown in FIG. 13(B) is executed to calculate the control data. That is:

Step #33: The difference "def" of the control signal Di in the predetermined number of preceding fields is calculated. A vibration period of the iris or a differential value of the changes in the vibration period may also be calculated on the basis of the obtained difference "def".

Step #34: The feedback coefficient k is set according to the difference value "def". In practice, in a case where "def" is large, the operation of the AE system may be stabilized by setting k to a smaller value so that the response of the iris can be slowed down.

Step #35: The operation expressed by Di=Din * k is performed so as to obtain iris control data. Thereafter, the processing returns to the main routine.

Step #25: The contents of the history memory 9' are renewed by the value calculated in step #24.

Step #14: Input of a vertical synchronizing signal (Vsync) is awaited for a certain number of fields.

Step #15: A chip-select signal is set.

Step #16: Parallel iris data is converted into serial sequence data, and the serial data is transmitted from the camera unit to the lens unit.

Step #17: The chip-select signal is reset.

Thus, communication of control data is performed between the camera unit and the lens unit, whereby iris control is performed.

In this data communication, a flag whose value indicates that the above-described processing is performed in the camera unit or in the lens unit, i.e., a flag whose value indicates whether the data transmitted from the camera unit to the lens unit is "processed data" or "raw data", may be set in the initial state (when power is turned on or when the lens is mounted) of communication, so that both types of data can exist in one system.

The processings from steps #23 to #25 may be executed by the camera unit or the lens unit. Further more, the subroutines shown in FIGS. 13(A) and 13(B) may be executed in either unit. Other algorithms that employ the history data of Di may also be used.

Furthermore, in the third, fourth, fifth and sixth embodiments, the codes representing the reference value and the exposure values which express the differences from this reference value are set beforehand, as shown in FIG. 7, and exposure control is performed by transmitting either of these codes. In this way, any type of interchangeable lens can be coped with without modifying the structure of the camera unit.

In other words, it is possible to provide an extendable system which is capable of coping with newly designed lenses without any problem, i.e., it is possible to greatly increase the possibility of the system expansion.

Furthermore, in the fifth and sixth embodiments, since the results of the analysis of the previous operations are utilized for the control, the response characteristic control of the system can be performed, which would be impossible in the conventional diaphragm control.

In particular, in a case where the control data is not transmitted from the camera unit for each field (e.g., in a case where the iris control data is transmitted once for two fields), as in the fifth embodiment, if the history memory is incorporated in the camera unit, deterioration of the response of the system can be eliminated.

What is claimed is:

1. An interchangeable lens system comprising:
    a camera unit and a lens unit that can be detachably mounted on said camera unit,
    wherein said camera unit includes exposure control signal forming means for forming a control reference value and an exposed state control signal indicating a difference relative to said control reference value on the basis of a common characteristic, an encoder for converting said exposed state control signal into coded data, and transmission means for transmitting said coded data to said lens unit, and wherein said lens unit includes control means for controlling the exposed state on the basis of the coded data received.

2. An image sensing apparatus of the type in which an exposed state is feedback controlled on the basis of an output of an image sensing means, comprising feedback control means for varying the amount of feedback according to a frequency of the changes in said output.

3. An image sensing apparatus according to claim 2, wherein said feedback control means includes memory means for storing a frequency of changes in said output of said image sensing means.

4. An image sensing apparatus according to claim 2, wherein said feedback control means controls such that the amount of feedback is decreased when said frequency is large.

5. An interchangeable lens system comprising:
    a camera unit and a lens unit that can be detachably mounted on said camera unit,
    wherein said camera unit includes exposure control signal forming means for forming a control reference value and and an exposed state control signal indicating a difference relative to said control reference value on the basis of a common characteristic, an encoder for converting said exposed state control signal into coded data, a memory for storing said coded data, and transmission means for transmitting said coded data to said lens unit, and wherein either said lens unit or said camera unit includes operation means for reproducing and correcting a dynamic characteristic of an exposed state control signal by performing an operation using said memory.

6. An interchangeable lens system according to claim 5, wherein said memory stores an average value of said coded data.

7. An interchangeable lens system according to claim 5, wherein said memory stores a frequency of changes in said coded data.

8. A system according to claim 7, wherein said memory is disposed at the side of the camera, and said exposed state control signal corrected by said operating means is transmitted to said lens unit at a predetermined period.

9. A system according to claim 8, wherein said predetermined period is V-sync.

10. A video camera, comprising:
    a video camera unit, including
        a) image sensing means for converting an incident light to an image signal; and
        b) exposure control means for outputting a control signal corresponding to a difference between a reference level and a level of the image signal output from said image sensing means; and
    a lens unit detachably mounted on said video camera unit, including
        c) an iris;
        d) driving means for driving said iris;
        e) control means for controlling said driving means according to the control signal transmitted from said video camera unit; and
        f) correcting means for correcting the control signal on the basis of a predetermined common characteristic.

11. A video camera according to claim 10, wherein said correcting means is arranged to correct a linearity of a driving characteristic of said iris.

12. A video camera according to claim 11, wherein said lens unit further includes an iris encoder for detecting an operating position of said iris and said control means is arranged to control said driving means so that an iris value detected by said iris encoder becomes equal to an iris value indicated by the control signal transmitted from the video camera unit.

13. A video camera according to claim 12, wherein said correcting means is arranged to correct an output of said iris encoder.

14. A video camera according to claim 10, further comprising transmission means, said transmission means being arranged between said video camera and said lens unit to transmit an information in synchronism with the V-sync and the information being transmitted by said transmission means.

15. A video camera according to claim 10, wherein said correcting means further includes a memory in which error information for said predetermined common characteristic of said control signal is stored.

16. A video camera according to claim 15, wherein said memory stores the error information concerning the iris control characteristic caused by the kinds of lens and the irregularities of the characteristic at the time of manufacturing.

17. A lens unit detachably mounted on a video camera, comprising:
    a) an actuator for varying an optical state of said lens unit;
    b) control means for controlling said actuator according to a control signal transmitted from said video camera;
    c) memory means for storing correction data for correcting an error between the control signal relative to a predetermined common characteristic; and
    d) correcting means for correcting an operation of said control means according to the correction data read out from said memory means so that said actuator is controlled on the basis of said predetermined common characteristic.

18. A lens unit according to claim 17, wherein said actuator is arranged to drive an iris.

19. A lens unit according to claim 18, wherein said correcting means is arranged to correct a linearity of a driving characteristic of said iris.

20. A lens unit according to claim 19, wherein said lens unit further includes an iris encoder for detecting an operating position of said iris and said control means is arranged to control driving means so that an iris value detected by said iris encoder becomes equal to an iris value indicated by the control signal transmitted from the camera unit.

21. A lens unit according to claim 20, wherein said correcting means is arranged to correct an output of said iris encoder.

22. A lens unit according to claim 17, further comprising transmission means, said transmission means being arranged between said video camera and said lens unit to transmit information in synchronism with the V-sync and the information being transmitted by said transmission means.

23. An image processing apparatus, comprising:
a) image sensing means for converting an incident light to an image signal;
b) an actuator for varying an optical state of said apparatus;
c) control means for outputting a control signal corresponding to a difference between a reference level and a level of the image signal output from said image sensing means and controlling said actuator on the basis of the control means;
d) memory means for storing information concerning a plurality of the control signals which had been previously output from said control means; and
e) correction data for correcting the control signal on the basis of said information stored in said memory means.

24. An apparatus according to claim 23, wherein said information is an average value of said plurality of the control signals.

25. An apparatus according to claim 23, wherein said information is a frequency of changes in the control signal.

26. A lens unit according to claim 23, wherein said actuator is arranged to drive an iris.

* * * * *

UNITED STATES PATENT AND TRADEMARK OFFICE
CERTIFICATE OF CORRECTION

PATENT NO. : 5,406,349
DATED : April 11, 1995
INVENTOR(S) : Koji Takahashi et al.

It is certified that error appears in the above-indentified patent and that said Letters Patent is hereby corrected as shown below:

Col. 4, line 50, Change "Following" to -- The following --.

Col. 5, line 8, Change "stared" to -- stored --.

Col. 10, line 44, Change "Further more" to -- Furthermore --.

Signed and Sealed this

First Day of August, 1995

Attest:

BRUCE LEHMAN

*Attesting Officer*  *Commissioner of Patents and Trademarks*